United States Patent [19]

Murphey et al.

[11] Patent Number: 4,665,988
[45] Date of Patent: May 19, 1987

[54] METHOD OF PREPARATION OF VARIABLE PERMEABILITY FILL MATERIAL FOR USE IN SUBTERRANEAN FORMATIONS

[75] Inventors: Joseph R. Murphey; Kenneth D. Totty; Susan V. Fulton, all of Duncan, Okla.

[73] Assignee: Halliburton Company, Duncan, Okla.

[21] Appl. No.: 848,365

[22] Filed: Apr. 4, 1986

[51] Int. Cl.$^4$ .............................................. E21B 33/138
[52] U.S. Cl. ...................................... 166/295; 405/264
[58] Field of Search ................ 166/276, 295; 405/258, 405/264; 523/130

[56] References Cited

U.S. PATENT DOCUMENTS

| | | |
|---|---|---|
| 2,633,458 | 3/1953 | Shokal . |
| 2,658,885 | 11/1953 | D'Alelio . |
| 3,477,990 | 11/1969 | Dante et al. . |
| 3,508,407 | 4/1970 | Booth .................................... 405/264 |
| 3,800,847 | 4/1974 | Rike .................................. 166/276 X |
| 3,931,109 | 1/1976 | Martin . |
| 3,948,855 | 4/1976 | Perry . |
| 4,042,032 | 8/1977 | Anderson et al. . |
| 4,048,141 | 9/1977 | Doorakian . |
| 4,074,760 | 2/1978 | Copeland et al. ............... 166/295 X |
| 4,081,030 | 3/1978 | Carpenter et al. .................. 166/276 |
| 4,101,474 | 7/1978 | Copeland et al. . |
| 4,199,484 | 4/1980 | Murphey . |
| 4,220,566 | 9/1980 | Constien et al. . |
| 4,247,430 | 1/1981 | Constien . |
| 4,428,427 | 1/1984 | Friedman ......................... 166/295 X |
| 4,584,327 | 4/1986 | Sutton ................................. 523/130 |

OTHER PUBLICATIONS

SPE Paper No. 15009–Darr et al presented at the Mar. 13-14, 1986, SPE—Permian Basin Oil/Gas Recovery Symposium.

*Primary Examiner*—George A. Suchfield
*Attorney, Agent, or Firm*—Robert A. Kent

[57] ABSTRACT

A method and composition for filling voids in a subterranean formation to provide a fill having a substantially uniform permeability. A viscosified aqueous fluid is prepared to which is added a first particulate having a particle size no greater than about 10 mesh, another particulate having a particle size of less than about 1/7th the median diameter of the first particulate and a resin composition capable of coating at least a portion of the particulate. The fluid is introduced into a subterranean formation to fill at least a portion of the voids that may be present in the formation, compacted and allowed to set to provide the permeable fill material.

20 Claims, No Drawings

METHOD OF PREPARATION OF VARIABLE PERMEABILITY FILL MATERIAL FOR USE IN SUBTERRANEAN FORMATIONS

BACKGROUND OF THE INVENTION

1. Field of the Invention

The present invention relates generally to a method of preparing a variable permeability material for the filling of voids in a subterranean formation and, more specifically, to a method of filling large voids created by open hole completions to permit conversion to cased hole completions or to permit permeable cementing of a perforated casing in a subterranean formation to facilitate secondary or tertiary recovery operations

2. Brief Description of the Prior Art

Numerous wells, particularly in older fields, have been open hole completed in one or more zones over an interval that may extend several hundred feet. Many of such wells have at least two and often three or more sections which, have been shot with explosives. The void area in the open hole surrounding the shot zone often has a diameter which exceeds 20 inches. To effect secondary recovery through waterflooding or carbon dioxide miscible flooding injection treatments, it is necessary to provide zonal isolation to the producing zones to minimize losses of injection water or carbon dioxide to non-productive zones. The zonal isolation can be effected in some situations by cementing casing within the open hole, however, when substantial voids are present in the zone of interest, cement is unsatisfactory. In such a situation, the cement sheath surrounding the casing after filling the shot hole is so thick that it is not possible to perforate the casing and effect communication through the cement to the zone of interest. This necessitates plugging and abandonment of the open hole and the drilling of a new well to effect isolation of the zone of interest. Such plugging and drilling operations substantially increase the cost of the secondary or tertiary hydrocarbon recovery project and in many instances may make the project economically unfeasible.

It would be desirable to provide a method by which void spaces surrounding a conduit penetrating a selected zone of interest in a subterranean formation can be filled with a variable permeability fill material whereby communication can be maintained between said zone of interest and said conduit while isolating said zone of interest from other portions of subterranean formations.

SUMMARY OF THE INVENTION

The present invention provides a method of preparing a fill material and method of filling voids in a subterranean formation while still effecting zonal isolation and maintaining desired permeability whereby communication to the formation is maintained and not substantially restricted.

The fill material is prepared by admixing a viscosifying agent with an aqueous fluid to provide a viscosified fluid. To this fluid is added particulate having at least two distinct particle size ranges. In one preferred embodiment, the larger material is admixed with the viscosified fluid followed by a resin capable of adhering the particulate particles together and a finer particulate having a median diameter of less than 1/7th and, preferably, from about 1/7th to 1/11th the median diameter of the larger particulate.

The finer particulate is admixed with the resin-viscosified fluid mixture in an amount of from about 1 to 30 percent by volume of the total particulate volume.

After mixing of the constituents in the viscosified fluid, the fill material is introduced into the void space within the subterranean formation by pumping through tubing or casing positioned within the well bore and out into the annulus region surrounding the conduit. Particular regions within a well bore can be isolated by packers or the like. After setting of the resin coated fill material, the excess fill material in the well bore can be drilled out and a suitable liner installed and cemented in place to isolate the zone of interest from surrounding zones.

DESCRIPTION OF THE PREFERRED EMBODIMENT

The method of the present invention is effected by preparing a resin coated fill material for introduction into a subterranean formation. The fill material is prepared by first preparing a viscosified fluid. The aqueous fluid utilized can comprise substantially any aqueous fluid such as water or a brine. Generally, a brine is preferred since it is more likely to be compatible with connate water that may be present in the formation. Preferred are brines having a density of up to about 9.5 lbs/gal such as can be produced by the addition of, for example, sodium, potassium, ammonium or calcium chloride to an aqueous fluid. Most preferably, the aqueous fluid comprises a 2 to 3 percent potassium chloride or ammonium chloride solution.

A viscosifying agent is admixed with the aqueous fluid to enhance the solids carrying capability of the aqueous fluid. A sufficient quantity of the viscosifying agent is admixed with the aqueous fluid to provide an initial viscosity to the fluid of at least about 25 centipoise.

Viscosifying agents are a well known class of compounds and include for example, polysaccharides comprising natural gums, such as guar gum and other galactomannans and derivatives and modifications thereof such as hydroxyalkyl guars, glucomannans, cellulosic derivatives such as cellulose ethers and particularly hydroxycellulose, water soluble starch derivatives, polyacrylamide and derivatives thereof, polyvinyl alcohols and the like. A preferred viscosifying agent comprises substituted hydroxyalkyl cellulose such as hydroxyethylcellulose (hereinafter HEC) having an ethylene oxide substituent ratio of about 1.0 to 3.0.

Generally, the viscosifying agent is admixed with the aqueous fluid in an amount of from about 20 to about 80 pounds per 1000 gallons of aqueous fluid and, preferably, an amount of from about 30 to about 40 pounds per 1000 gallons of aqueous fluid.

The aqueous fluid also generally includes or contains a surfactant or mixture of surfactants to aid in the wetting of the particulate material which is subsequently admixed with the viscosified fluid. In one embodiment, the surfactant can comprise a compound such as that of the following general formulas:

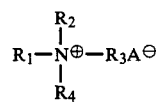

Formula I

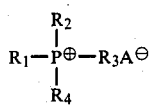

Formula II

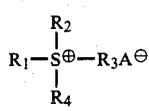

Formula III wherein $R_1$ is a hydrophobic organic group of at least seven carbon atoms, and is preferably benzyl or an alkylated benzyl group of from 7 to about 25 carbon atoms; $R_2$ and $R_3$ are each independently lower alkyl or 2-hydroxy (lower alkyl), and are preferably 2-hydroxyethyl with the proviso that at least one of $R_2$ and $R_3$ is 2-hydroxyethyl; and $R_4$ is a 2-hydroxyethyl alkyl group or alkyl of from 1 to about 18 carbon atoms; and $A^\ominus$ is an anion. Surfactants of Formula I are preferred, based on commercial availability. Suitable surfactants include, for example, benzyl-bis (2-hydroxyethyl)-methylammonium chloride, benzyl-bis(2-hydroxyethyl)octadecylammonium chloride, 4-t-butylbenzyl-bis(2-hydroxyethyl)-methylammonium chloride, 4-dodecylbenzyl-(2-hydroxyethyl)-dimethylammonium chloride, 3,5-dimethylbenzyl-bis(2-hydroxyethyl)-decylammonium chloride, and the like, and the corresponding bromide, phosphate, acetate, propionate, benzoate and picrate salts, and the like and the corresponding phosphonium salts, and sulfonium salts, such as 4-octylbenzyl bis(2-hydroxyethyl)sulfonium chloride, 4-dodecylbenzyl bis(2-hydroxyethyl)sulfonium chloride, and the like.

Mixtures of cationic surfactants and noncationic surfactants also can be used. The blend or mixture of surfactants preferably comprises at least one cationic surfactant with limited water solubility and at least one water miscible surfactant which is not cationic. The noncationic surfactant can be either nonionic, anionic or a mixture thereof. It may be a weakly ionized salt of the cationic surfactant and a weak organic acid such that the salt is not hydrolyzed in the carrier fluid, e.g. salicyclic, oxalic, maleic and citric. The noncationic surfactant should be present in an amount of at least about 10% of said surfactant mixture. The cationic, nonionic and anionic surfactants are normally liquid, synthetic or naturally occurring surfactants which can contain alkyl, aryl, hetero and unsaturated radicals or groups which contain about 8 to 18 carbon atoms per radical. In addition, these surfactants can contain substituent groups such as hydroxyl, carboxyl, sulfonyl, amine and other substituent groups to control the hydrophilic-hydrophobic balance of the surfactant within the HLB range of about 3 to 8. The HLB balance is defined in *Emulsions, Theory and Practice*, by Paul Becher, Reinhold Publishing Corp., (1957), pp 233-253, the disclosure of which is incorporated herein by reference.

After the surfactant is added to the aqueous fluid containing the viscosifying agent, either the particulate material or the resin is sequentially admixed with the aqueous fluid. In one preferred embodiment, the large particulate is admixed with the aqueous fluid followed by the resin and then the finer particulate. The particulate preferably comprises graded sand particles. However, glass beads, bauxite, sintered bauxite, ceramic beads or the like also may be utilized. The large particulate has a particle size of about 10 mesh or less on the U.S. Sieve Series and, preferably, less than 20 mesh and, most preferably, less than 60 mesh. The particulate is admixed with the aqueous fluid until it is substantially admixed with the fluid after which the resin is admixed and uniformly blended with the fluid to coat the particulate present.

The resin composition for use in the present invention comprises an epoxy resin with a suitable hardening or curing agent.

The resin used herein is an epoxy resin which bears, on the average, more than one terminal or pendant 1,2-epoxy group per resin molecule.

The epoxy equivalency of such compounds is, therefore, greater than one. The meaning and test for epoxy equivalency is described in U.S. Pat. No. 2,633,458. Various examples of epoxy resins (alternatively known as polyepoxides) that can be used in the present invention are shown in U.S. Pat. Nos. 2,633,458; 3,477,990; 3,931,109; 3,948,855; 4,101,474; 4,048,141 and in the texts: *Handbook of Epoxy Resins* by H. Lee and K. Neville, McGraw-Hill Book Co. (1967) and *Epoxy Resins-Chemistry and Technology*, edited by C. May and Y. Tanaka, Marcel Dekker, Inc., N.Y. (1973), the disclosures of which are incorporated by reference. The glycidyl ethers of polyhydric phenols are the best known epoxy resins, from a commercial standpoint, and therefore preferred. Two examples of formulas of such compounds are set forth below:

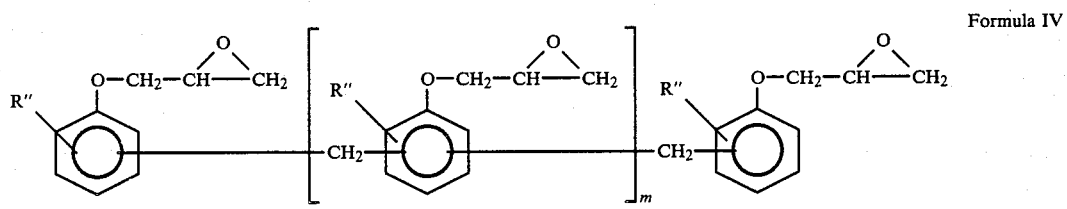

Formula IV wherein R" is hydrogen or an alkyl radical, preferably hydrogen; and m is from about 0.1 to about 10, preferably from about 1 to about 2. Preparation of these polyepoxides is illustrated in U.S. Pat. No. 2,216,099 and 2,658,885. The second corresponds to the general formula:

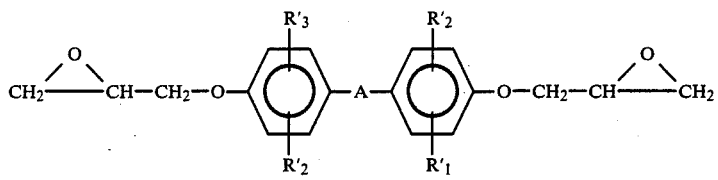
Formula V wherein $R'_1$, $R'_2$, $R'_3$ and $R'_4$ are independently selected from hydrogen, bromine and chlorine and wherein A is a single covalent bond or an alkylene (e.g., methylene) or alkylidene (e.g., isopropylidene) group having from about 1 to about 4 carbon atoms, or A is a divalent radical of the formulas:

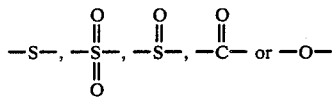
Formula VI

When used in the present invention, the epoxy resin is included in the resin system in an amount sufficient to coat the particulate solid material in the aqueous fluid and will, obviously, vary depending upon the particle size, porosity, etc., of the material being coated. Amounts of epoxy resin beyond that required to coat the particles is normally undesirable because excess resin can adversely affect the permeability of the cured pack, can cause formation damage, and can also make it difficult to remove the excess portion of the cured fill material in the well bore. It will be understood that in this system, or in most multicomponent systems, optimization may be required because the limits of operability for one component depend to some extent on other components in the system. Optimization will not require any undue experimentation on the part of a skilled artisan. Generally, however, an effective slurry is obtained by employing from about 4 to about 20 percent, and preferably, from about 5 to about 10 percent of the resin composition comprising the epoxy resin and any diluents that may be present based on the weight of the particulate material employed. More preferably, the resin composition is employed in an amount ranging from about 6 to about 9 weight percent of the particulate.

In the present application, the epoxy resin is normally dissolved in an inert organic solvent or diluent and the solution added directly to the aqueous fluid. Suitable solvents include, for example, aromatic hydrocarbons, alcohols, esters, ethers, ketones and the like, and mixtures thereof. Specific solvents include, for example, toluene, xylene, isopropanol, n-butanol, ethyl acetate, methyl propionate, ethylene glycol mono-n-butyl ether, diethylene glycol monomethyl ether, diethylene glycol mono-n-butyl ether, methyl ethyl ketone, and the like. Suitable combinations of solvents include, for example, xylene/ethylene glycol monoethyl ether, toluene/ethylene glycol monoethyl ether, and the like. When employed with a resin of the bisphenol-A/epichlorohydrin type, a preferred embodiment is to employ from about 20 to about 75 parts of the aforementioned xylene/ethylene glycol ethyl ether combination of solvents per 100 parts by weight of resin. Selection and optimization of a solvent system is within the skill of the art. One suitable hardener or curing agent suitable for the resins of Formulas IV and V comprises a compound in the following formula:

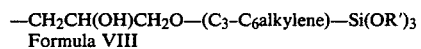
Formula VII wherein: m is from 0 to about 10, and preferably from 0 to about 4; each R independently is H or Y provided that at least one R is Y; and Y is —CH$_2$CH(OH)CH$_2$O—(C$_3$-C$_6$alkylene)—Si(OR')$_3$
Formula VIII and each R' independently is hydrogen or lower alkyl, and is preferably methyl or ethyl and is more preferably methyl.

The compound of Formula VII is conveniently prepared by reacting an aromatic amine of the following formula:

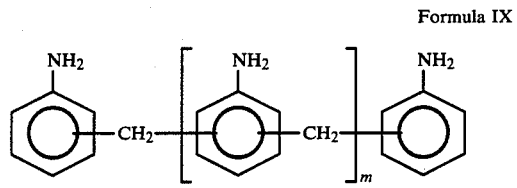
Formula IX wherein m has the aforesaid meaning, with an epoxy silane of Formula X:

Formula X wherein each R' independently is hydrogen or lower alkyl and is preferably methyl or ethyl and is more preferably methyl.

The reaction is conducted by merely blending reactants IX and X together in liquid phase and under conditions sufficient to promote the reaction. The ratio of reactants can be varied from a substantial excess of IX up to one equivalent weight of IX per mole of X, based on the number of primary amino groups on IX. The reaction product of excess aromatic amine IX and the epoxy silane X is preferred because the excess of IX is also compatible in the epoxy resin system. The temperature of the reaction is likewise not critical as long as it is sufficient to promote the desired reaction at a reasonable rate and is below the thermal decomposition temperature of the reactant or reaction product and below the temperature at which the epoxy silane autopolymerizes. Normally, an acceptable rate of reaction is achieved at a reaction temperature of from about 60° C. to about 85° C. The reaction is also conducted under substantially anhydrous conditions due to the susceptibility of the epoxy silane (Formula X) to hydrolyze.

Epoxy silane reactants used in the preparation of VII are normally selected such that R' is other than hydrogen. After the product VII is formed, the degree of hydrolysis of the silane substituent is not particularly important and stringent efforts to prevent hydrolysis are not required.

The aromatic amine reactants IX are a known class of compounds. They are normally obtained from commercial sources as a mixture of polymethylene polyphenyleneamines, each component of which corresponds to Formula IX but with different values for m. As a result, product VII likewise is a mixture of compounds of Formula VII in which m is varied. Such mixtures are preferred due to the commercial availability of the starting material IX and to the fact that such mixtures are normally liquid rather than solid.

The epoxy silane reactants X are likewise a known class of compounds. Those members in which the ($C_3$–$C_6$alkylene) group is a —$CH_2CH_2CH_2$— group are best known from a commercial standpoint and are thus preferred.

The curing agent can be used alone or in combination with other compatible curing agents which also may be used alone or in combination with one another. Such compatible curing agents include, for example, aliphatic, cycloaliphatic, aromatic and heterocyclic polyamines, such as the polymethylene polyphenyleneamines, methylenedianiline, ethylenediamine, diethylenetriamine, triethylenetetraamine, dimethylaminopropylamine, diethylaminopropylamine, piperidine, triethylamine, benzyldimethylamine, N,N-dimethylaminopyridine, 2-($N_2$N-dimethylaminomethyl)-phenol, tris(dimethylaminomethyl), phenol, and the like. Such amino-containing agents are well known. See, for example, the texts by Lee et al and May et al cited above and U.S. Pat. No. 3,477,990 at column 8, lines 32-60.

Optional components in the resin composition include retarders and accelerators. Suitable retarders comprise acid or acid producing compositions, some of which can also serve as diluents. The retarders should also be at least partially soluble in water and soluble in the epoxy resin composition. The retarder should be selected to produce the desired rate of hydrolysis or acid production according to the temperature and working times desired. The low molecular weight organic acid retarders are preferably produced by hydrolysis of an organic compound having a hydrolysis constant K of about $4 \times 10^{-5}$. The acid produced by hydrolysis should have at least two carbon atoms such as 2-5 carbon atoms and preferably 2-3 carbon atoms. The other half of the organic compound (i.e., ester or ether) should not interfere with the coating or setting of the resin and preferably acts as a diluent for the resin. The other half of the hydrolysis product can have up to 18 carbon atoms.

The accelerators used with the composition of this invention are weak organic acids with additional water soluble components. These water soluble compounds can be low molecular weight inorganic or organic salts containing about 2 to 18 carbon atoms which are water soluble and readily dispersed in the gelled aqueous fluid and are also at least partially soluble in the epoxy resin composition.

Examples of the retarders include methyl and ethyl esters of low molecular weight alkyl acid ($C_2$–$C_3$) and the esters of the above diluents. Examples of the accelerators include salicyclic, hydroxybenzoic, citric, fumaric, oxalic and maleic acids.

In the absence of a hardening agent such as the compound of Formula VII containing epoxy silanes, it may be desirable to include a coupling agent in the resin. The coupling agent functions to chemically bond the cured organic resin to the surface of the particulate. Such silanes may be, for example, amino-functional, epoxy-functional or vinyl-functional. Specific examples of such silane-type coupling agents include Silane A-1120, a Union Carbide product (m-beta-(amine-ethyl)-gamma-aminopropyltrimethoxy silane), Silane A-187, another Union Carbide product, or Silane A-1130, another Union Carbide product. The use of such compounds is well known and understood by those skilled in the art.

The amount of the curing agent included in the resin can be varied. A sufficient quantity of the curing agent should be used to provide a good bond between the crosslinked or cured epoxy resin and the particulate material. Normally, the curing agent is used in an amount of from about 5 to about 100 percent by weight of the resin composition and, generally, it depends upon the specific hardener chosen for use with the epoxy resin. The specific quantity required is readily determinable by individuals skilled in the art by the methods set forth in Lee and Neville, cited previously.

After the resin has thoroughly admixed with the large particulate, finer particulate is admixed with aqueous fluid. The finer particulate has a particle size such that the median diameter of the particles are less than about 1/7th and, preferably, in the range of from about 1/7th to about 1/11th of the median diameter of the larger particulate. The finer material is admixed with the aqueous fluid in an amount such that from about 1 to about 30 percent by volume of the particulate comprises fines. Preferably, from about 5 to 25 percent and, most preferably, from about 5 to 10 percent by volume of the particulate comprises fines. The volume and size of the fines material is critical to the effective retention of the desired permeability and porosity of the fill material. As is well known, sedimentation is a problem when various particle size materials are admixed and pumped into a vertical column such as a well bore. Surprisingly, fill material prepared in accordance with the present invention substantially reduces the tendency of the particulate to undergo sedimentation, thereby providing a more uniform particulate distribution in the subterranean void spaces containing the fill material. It has been found that at least a portion of the fine particulate seems to cluster upon the surface of the larger particulate which has been coated with the resin composition. This effect provides the more uniform porosity to the fill material. Additional resin compositions suitable for use in the present invention are disclosed in U.S. Pat. Nos. 4,199,484 and 4,247,430, the entire disclosures of which are incorporated herein by reference.

In an alternate embodiment of the present invention, the resin can be admixed with the viscosified fluid prior to addition of the particulate followed by addition of the large particulate and then the fine particulate to produce the fill material.

In yet another embodiment of the invention, the fine particulate and large particulate can be admixed with the viscosified fluid prior to addition of the resin. The resin then is admixed with the viscosified fluid and particulate to coat the particulate. It has been found that this particular procedure, while operable, is least preferred in comparison to the others described herein.

The use of this order of addition requires substantial additional mixing time in comparison to the other methods to effect coating of the large particulate and agglomeration of the finer particulate upon the larger particulate. Further, a larger quantity of resin often is required to coat the particulate in comparison to the other described methods which is undesirable from an economic standpoint.

After the sand particles and epoxy resin composition are thoroughly mixed with the gelled aqueous fluid, a breaker composition is added. The breaker can comprise any of the conventionally known breakers which is suitable for the particular conditions present. Such compounds are well known to individuals skilled in the art. The total mixture then is pumped into the desired location either behind a well bore or in a cavity or void space adjacent the well bore and formation and generally compacted by the application of pressure to the fluid in accordance with the methods well known to individuals skilled in the art. The gel breaking mechanisms should be timed according to the working time and temperature requirements so that the aqueous gel breaks within a short time after reaching the desired location where the resin coated sand is to be deposited. This breaking of the aqueous gel shortly after placement aids in separating the aqueous fluid from the resin coated sand thereby permitting easy removal of the aqueous fluid either through or around tubing in the well or by forcing the aqueous fluid into the formation. Breaking of the aqueous gel substantially immediately after placement also permits the resin coated sand particles to pack in close proximity and tightly against each other in the formation to form a stronger permeable porous pack of fill material. Setting of the epoxy resin composition should also be timed so that the epoxy resin becomes tacky after the particles are placed in the desired location and forced together in a tight pack so that the coated particulate will have maximum contact when the resin becomes tacky and begins to set thereby producing a stronger permeable porous pack.

A factor in the process and compositions of this invention is the ability to coat the suspended or in situ particles with an epoxy resin composition in the presence of a gelled aqueous fluid containing a polymer gelling agent such as a polysaccharide as illustrated by a substituted hydroxyethylcellulose polymer or a substituted guar gum polymer. This is accomplished by the particular composition which balances the adsorption and coating characteristics of the epoxy resin composition as compared to that of the polymer gelling agent. This is especially significant since either a fresh water, brine or sea water aqueous phase can be used. Preferably, the pH should be adjusted within the range of about 4 to 9 depending upon the surfactants, gelling agents, epoxy curing agents and breaker systems used, which also depends on the temperature. The process and compositions are generally insensitive to variations in pH, temperature and contaminants within the given ranges. The ability to absorb and coat the sand particles with epoxy resin in the presence of the polymer gels also makes it possible to provide the necessary working time and place the resin coated particles in the same fluid in which the sand particles are coated. Additional advantages are also possible due to the control of the breaking time of the aqueous gel and the setting time of the epoxy resin composition. Controlling these factors makes it possible to form the consolidated annular zone or fill in a very short time and to cure the resin within the period of time of less than 24 hours, thereby requiring a very short shut in time. The epoxy resin acquires substantial strength rapidly within a period of about less than 12 hours and about 80% of its consolidation strength within about 24 hours, thereby producing a simple yet fast and efficient consolidation and fill method, composition and technique. With the compositions and processes of this invention, most conventional additives and conventional process steps can be used. As pointed out before, an emulsion of the epoxy resin composition and the gelled aqueous fluid should be avoided since this prevents effective coating and placement of the epoxy resin composition or epoxy coated sand particles in the gelled aqueous fluid. It may be desirable to use a preflush to condition the formation for in situ consolidation or to condition the formation adjacent the area to be filled to prevent contamination, maintain maximum permeability or treat the formation particles so that any excess resin flushed through the formation will either not absorb or absorb to the extent desired to produce the desired permeability. Likewise, afterflushes may be used to insure uniform placement, consolidation and maximum permeability of the fill material and formation being treated.

The gel breaker generally can be selected from three classes depending upon the application temperature, working time, pH concentration limits and contaminants which might be encountered. These three classes include (1) an enzyme-type breaker such as cellulase or hemi-cellulase for a substituted cellulose gelling agent, (2) a low molecular weight organic hydroperoxide such as tertbutyl-hydroperoxide or an alkyl hydroperoxide containing about 2 to 18 carbon atoms and a surfactant including both tertiary and quaternary amine, or (3) a combination of an organic hydroperoxide with a cupric ion supplying salt for low temperature applications and/or surfactant containing both tertiary and quaternary amines. The conventional inorganic peroxides sometimes do not work with certain combinations of surfactants, coating agents, hardeners and retarders which are frequently necessary for the coating and adsorption properties of the compositions and process of this invention. In addition, certain contaminants can also interfere with the conventional curing agents and some components which may be selected for the compositions of this invention. Some conventional additives can be used such as clay treating additives and the like.

A particularly preferred composition of this invention uses an aqueous HEC gel and sand or silica as the particulate and a polyepoxide resin composition which can be used over a temperature range of about 70° F. to 250° F. for a practical application and in some instances to slightly higher than about 300° F. The preferred aqueous gels as described herein are formulated to produce a working time or to break the aqueous gel within a period of about 1½ to 2 hours. The preferred epoxy resin is an epichlorohydrin bisphenol-A copolymerization product such as Shell's Epon 828. The preferred catalyst or epoxide hardener for use with the preferred epoxy and other additives is methylenedianiline. Other hardeners can also be used as described herein. An accelerator such as salicylic acid is preferred with the methylenedianiline at temperatures of about 140° F. and lower. Other accelerators which can be used comprise phenols and substituted phenols. Amino functional silanes and surfactants are also preferred to promote resin adsorption and coating onto the sand in the presence of the HEC gel. For retarding the curing of the epoxy resin, acetic acid can be used at higher temperatures. Ethyl acetate and higher boiling esters such as ethyl glycol diacetate can also be used. Additional esters which can be used include the methyl esters of acrylic and fumaric acid and similar strength organic acids which have some water solubility and some solubility in the epoxy resin composition. Ethyl glycol diacetate can be used to prolong working time of the methylenedianiline catalyzed resin at temperatures of about 170° F. and above since the diacetate has a boiling point of over about 300° F. while the ethyl acetate ester has a boiling point of about 160° F. The preferred aqueous fluid for dispersing the particulate and epoxy resin of this invention can contain from about 2% to 10% and, preferably, 2% to 3% of an alkali metal salt such as the halides and an ammonium halide such as ammonium chloride. In addition, sea water can be used if care is taken to avoid calcium precipitation with some of the components of the system. Salts which can be present in the aqueous gel include sodium chloride, calcium chloride, potassium chloride, calcium bromide, ammonium chloride and buffering agents such as fumaric acid and ammonium carbonate. The aqueous gel is preferably buffered so that the pH is in the range of about 6 to 8 for greater predictability of the gel breaking time and epoxy resin hardening time.

The surfactants generally should be present in the aqueous fluid in the amount of up to about 1-1/2% or at least a quantity sufficient to coat the silica surfaces of the particulate and saturate the aqueous gel. When a blend of cationic and noncationic surfactants is employed, if an insufficient quantity of cationic surfactant is used to thoroughly coat the silica surfaces a loss of consolidation strength of the consolidated pack will result. Likewise, the blend of cationic to noncationic surfactant is critical in the presence of polymer gelling agents which adsorb or act as colloids in the presence of the silica particles. The surfactant blend should contain at least about 10 to 25% cationic surfactant and up to about 60% to 75% cationic surfactant or have a preferred ratio of cationic to noncationic surfactant of about 2 to 3. With the aqueous polymer gelling agent and cationic surfactants present, certain organic phosphate defoaming agents and other similar additives known to be water wetting interfere with the coating action and therefore cannot be used. A silicon type or polypropylene glycol type defoaming agent can be used.

The optimum blend of surfactants for adsorption and coating of the epoxy resin onto silica surfaces will vary with the application parameter such as pH, temperature and other components present. However, the preferred surfactants, when a blended surfactant is employed, are primarily linear having a molecular weight of about 160 to 600 and containing alkyl, aryl, hetero and unsaturated groups of radicals wherein each group or radical contains about 2 to 12 carbon atoms. The amine quaternary type cationic surfactants are preferred for the major portion of the surfactant blend used to control adsorption and coating of the epoxy resin. The noncationic surfactant can also be an amine type surfactant but should be anionic or nonionic in overall character. It should be water miscible at ambient temperatures. This blend of cationic with a minor portion of noncationic surfactant can be varied depending upon the gelling polymer and the aqueous fluid selected. Each of the components should be tested with the entire system and parameter selected for compatibility.

To further illustrate the present invention and not by way of limitation, the following example is provided.

EXAMPLE

A well in a waterflood project in southeastern New Mexico was identified as a problem well for injection fluid loss control. Fluid appeared to be lost during injection into stratigraphically higher zones from the uncased hole. The well had three large shot holes and substantial sloughing from the well bore near the shot zones. A decision was made by the operator to case the well and isolate the injection zones from the higher zones taking fluid. The well had an average diameter of from 17 to 20 inches in the areas of the shots, and the unshot regions had a nominal 7-inch diameter. The well had a total depth of about 4,024 feet and the injection was occurring between 3550 feet and 4024 feet. The use of cement to fill the voids was unacceptable because it would not be possible to re-establish formation communication through the thick sheath of cement about the casing. To prepare the well for treatment in accordance with the present invention, the following steps were performed.

All injection equipment was removed from the well bore, and the hole was plugged back with crushed oyster shells to 3570 feet which was 20 feet below the production casing shoe. A 100 pound cement plug was set above the oyster shells and a squeeze cementing procedure was effected to seal the formation in the area of the production casing shoe. After the cement hardened, the well bore was drilled out to 4024 feet and the open hole was jet washed to remove loose formation rock and mineral scale. The formation then was treated with a 15% hydrochloric acid solution to remove acid soluble material which then was flowed out of the well with a 2% KCl solution.

The composition of the present invention was prepared as follows:

Fifty barrels (42 U.S. gallons per barrel) of 2% KCl solution is viscosified with hydroxyethylcellulose present in an amount of about 40 pounds per 1000 gallons of KCl solution. A cationic-noncationic surfactant blend of the type previously described was admixed with the aqueous fluid in an amount of about 0.6% by volume of the aqueous fluid. 33.125 barrels of the gelled fluid then was admixed with 25,250 pounds of particulate and resin in accordance with the method of the present invention in a paddle mixer. The particulate comprised 22,200 pounds of 70 to 170 mesh sand and 1100 pounds of 220 to 400 mesh sand. The resin, hardener, diluent and other constituents of the resin composition comprised about 2000 pounds and had a volume of about 200 gallons. The mixing process took approximately two hours to complete. The particulate fill material then was pumped down through a work string into the zone to be filled. The material was displaced from the work string with 18 barrels of 8.4 lb/gal KCl brine and the string pulled immediately from the fill material. A pressure of 150 psi then was applied at the surface to compact the fill material and the well was shut in for 30 hours to permit the gel to break and the resin to harden. The well then was drilled out to a depth of 4024 feet with a 6¼" milled tooth bit and the intervals between 3560 to 3575 and 3670 to 3850 feet were underreamed to 7" to remove the permeable fill material. A 4½" liner then was run and cemented in place. The excess cement was drilled out and the well perforated at 3636 to 3595 feet and 4005 to 3890 feet with a total of 158 shots.

The perforations where the shot open holes existed were straddled individually with bridge plugs and packers. Injection rates and pressure were recorded, and the intervals were tested for communication. No communication was found between the zones and injectivity increased from 0.00403 bbl/psi/net effective pay zone (NEP) to 0.00857 bbl/psi/NEP. Thus, the effectiveness of the composition in maintaining permeability and porosity is clearly illustrated.

While that which is considered to be the preferred embodiment of the invention has been described herein, it is to be understood that modifications and changes can be made in the composition and method without departing from the spirit or scope of the present invention as set forth in the appended claims.

What is claimed is:

1. A method of filling voids in a subterranean formation comprising the steps of:
   admixing an aqueous fluid with a viscosifying agent comprising a polysaccharide in an amount sufficient to viscosify said aqueous fluid;
   admixing a first particulate with said viscosified aqueous fluid, said particulate having a particle size of no greater than about 10 mesh;
   admixing a resin composition with said viscosified aqueous fluid in an amount of from about 4 to about 20% by weight of the particulate;
   admixing a second particulate with said viscosified aqueous fluid, said second particulate having a median diameter of less than about 1/7th the median diameter of said first particulate, said second particulate comprising from about 1 to about 30% by volume of the particulate present;
   coating said first particulate with said resin in said viscosified fluid prior to admixture of said second particulate whereby upon addition of said second particulate at least a portion of said second particulate is caused to cluster about and adhere to the individual particles of the first particulate;
   introducing said viscosified aqueous fluid containing said resin coated particulate into a subterranean formation containing voids whereby at least a portion of said voids are filled by said viscosified aqueous fluid containing said particulate; and
   compacting said particulate in said voids by application of pressure to said viscosified aqueous fluid to provide a fill material having a substantially uniform permeability upon hardening of the resin composition.

2. The method of claim 1 wherein said first particulate has a particle size of about 60 mesh or smaller.

3. The method of claim 1 wherein said second particulate comprises from about 5 to about 25% by volume of the particulate present.

4. The method of claim 1 wherein said second particulate comprises from about 5 to about 10% by volume of the particulate present.

5. The method of claim 1 wherein said viscosifying agent comprises at least one member selected from the group consisting of guar, derivatized guar and derivatized cellulose.

6. The method of claim 1 wherein said viscosifying agent is present in an amount of from about 20 to about 80 pounds per 1000 gallons of aqueous fluid.

7. The method of claim 1 wherein said viscosifying agent is present in an amount of from about 30 to about 40 pounds per 1000 gallons of aqueous fluid.

8. The method of claim 1 wherein said second particulate has a median diameter in the range of from about 1/7th to about 1/11th the median diameter of the first particulate.

9. The method of claim 1 wherein said resin composition is present in an amount of from about 5 to about 10 percent by weight of the particulate.

10. The method of claim 1 wherein the epoxy resin is an epichlorohydrin bisphenol-A copolymerization product and a hardener comprising methylenedianiline is utilized to cure the resin.

11. A method of filling voids in a subterranean formation comprising the steps of:
    admixing an aqueous fluid with a viscosifying agent comprising a polysaccharide in an amount sufficient to viscosify said aqueous fluid;
    admixing a first particulate with said viscosified aqueous fluid, said first particulate having a particle size of no greater than about 10 mesh;
    admixing another particulate with said viscosified aqueous fluid, said another particulate having a particle size having a median diameter of less than about 1/7th the median diameter of said first particulate, said another particulate comprising from about 1 to about 30% by volume of the particulate present;
    admixing a resin composition and a hardener with said viscosified aqueous fluid in an amount sufficient to effect at least partial coating of the total particulate admixed with said viscosified fluid whereby at least a portion of the first particulate is coated by said resin composition and at least a portion of said another particulate is caused to adhere upon the surface of said first particulate;
    introducing said viscosified aqueous fluid containing said resin coated particulate into a subterranean formation containing voids whereby at least a portion of said voids are filled by said viscosified aqueous fluid to provide a fill material upon hardening of said resin composition having a substantially uniform permeability.

12. The method of claim 11 wherein said first particulate has a particle size of no greater than about 60 mesh.

13. The method of claim 11 wherein said another particulate comprises from about 5 to about 25% by volume of the particulate present in the viscosified aqueous fluid.

14. The method of claim 11 wherein said viscosifying agent comprises at least one member selected from the group consisting of guar, derivatized guar and derivatized cellulose.

15. The method of claim 11 wherein said viscosifying agent is present in an amount of from about 20 to about 80 pounds per 1000 gallons of aqueous fluid.

16. The method of claim 11 wherein said second particulate has a median diameter in the range of from about 1/7th to about 1/11th the median diameter of the first particulate.

17. A method of filling voids in a subterranean formation comprising the steps of:
    admixing an aqueous fluid with a viscosifying agent comprising a polysaccharide in an amount sufficient to vscosify said aqueous fluid; admixing in the following sequence:
    (a) a first particulate with said viscosified aqueous fluid, said particulates having a particle size of no greater than about 10 mesh;

(b) a reson composition with said viscosified aqueous fluid in an amount of from about 4 to about 20% by weight of the particulate; and (c) a second particulate with said viscosified aqueous fluid, said second particulate having a median diameter of less than about 1/7th the median diameter of said first particulate, said second particulate comprising from about 1 to about 30% by volume of the particulate present;

coating said first particulate with said resin in said viscosified fluid prior to admixture of said second particulate whereby upon addition of said second particulate at least a portion of said second particulate is caused to cluster about and adhere to the individual particles of the first particulate;

introducing said viscosified aqueous fluid containing said resin coated particulate into a subterranean formation containing voids whereby at least a portion of said voids are filled by said viscosified aqueous fluid containing said particulate; and compacting said particulate in said voids by application of pressure to said viscosified aqueous fluid to provide a fill material having a substantially uniform permeability upon hardening of the resin composition.

18. A method of filling voids in a subterranean formation comprising the steps of:

admixing an aqueous fluid with a viscosifying agent comprising a polysaccharide in an amount sufficient to viscosify said aqueous fluid;

admixing in the following sequence:

(a) a resin composition with said viscosified aqueous fluid in an amount of from about 4 to about 20% by weight of the particulate;

(b) a first particulate with said viscosified aqueous fluid, said particulate having a particle size of no greater than about 10 mesh;

(c) a second particulate with said viscosified aqueous fluid, said second particulate having a median diameter of less than about 1/7th the median diameter of said first particulate, said second particulate comprising from about 1 to about 30% by volume of the particulate present, coating said first particulate with said resin in said viscosified fluid prior to admixture of said second particulate whereby upon asddition of said second particulate at least a portion of said second particulate is caused to cluster about and adhere to the individual particles of the first particulate;

introducing said viscosified aqueous fluid containing said resin coated particulate into a subterranean formation containing voids whereby at least a portion of said voids are filled by said viscosified aqueous fluid containing said particulate; and compacting said particulate in said voids by application of pressure to said viscosified aqueous fluid to provide a fill material having a substantially uniform permeability upon hardening of the resin composition.

19. A method of filling voids in a subterranean formation comprising the steps of:

admixing an aqueous fluid with a viscosifying agent comprising a polysaccharide in an amount sufficient to viscosify said aqueous fluid;

admixing in the following sequence;

(a) a first particulate with said viscosified aqueous fluid, said first particulate having a particle size of no greater than about 10 mesh;

(b) a resin composition and a hardener with said visosified aqueous fluid in an amount sufficient to effect at least partial coating of the total particulate admixed with said viscosified fluid; and (c) another particulate with said viscosified aqueous fluid, said another particulate having a particle size having a median diameter of less than about 1/7th the median diameter of said first particulate said another particulate comprising from about 1 to about 30% by volume of the particulate present, whereby at least a portion of the first particulate is coated by said resin composition and at least a portion of said another particulate is caused to adhere upon the surface of said first particulate;

introducing said viscosified aqueous fluid containing said resin coated particulate into a subterranean formation containing voids whereby at least a portion of said voids are filled by said viscosified aqueous fluid to provide a fill material upon hardening of said resin composition having a substantially uniform permeability.

20. A method of filling voids in a subterranean formation comprising the steps of:

admixing an aqueous fluid with a visosifying agent comprising a polysaccharide in an amount sufficient to viscosify said aqueous fluid;

admixing in the following sequence:

(a) a resin composition and a harder with said viscosified aqueous fluid in an amount sufficient to effect at least partial coating of the total particulate to be admixed with said viscosified fluid;

(b) a first particulate with said viscosified aqueous fluid, said first particulate having a particle size of not greater than about 10 mesh; and (c) another particulate with said vscosified aqueous fluid, said another particulate having a particle size having a median diameter of less than about 1/7th the median diameter of said first particulate said another particulate comprising from about 1 to about 30% by volume of the particulate present, whereby at least a portion of the first particulate is coated by said resin composition and at least a portion of said another particulate is caused to adhere upon the surface of said first particulate;

introducing said viscosified aqueous fluid containing said resin coated particulate into a subterranean formation containing voids whereby at least a portion of said voids are filled by said viscosified aqueous fluid to provide a fill material upon hardening dening of said resin composition having a substantially uniform permeability.

* * * * *

UNITED STATES PATENT AND TRADEMARK OFFICE
CERTIFICATE OF CORRECTION

PATENT NO. : 4,665,988
DATED : May 19, 1987
INVENTOR(S) : Joseph R. Murphey, Kenneth D. Totty, Susan V. Fulton It is certified that error appears in the above-identified patent and that said Letters Patent is hereby corrected as shown below:

In Column 15, line 1, delete the word [reson] and insert therefore, -- resin --.

Signed and Sealed this

Tenth Day of November, 1987

Attest:

DONALD J. QUIGG

*Attesting Officer*          *Commissioner of Patents and Trademarks*